United States Patent
Elder et al.

(10) Patent No.: US 7,492,946 B2
(45) Date of Patent: Feb. 17, 2009

(54) SYSTEM, METHOD AND COMPUTER PROGRAM FOR AN INTEGRATED DIGITAL WORKFLOW FOR PROCESSING A PAPER FORM

(76) Inventors: Michael James Elder, Elderberry Hill Farm, 14092 Yonge Street, Aurora, Ontario (CA) L4G 3G8; Robert N. Smith, 14 Calverley Drive, Toronto, Ontario (CA) M9R 2L8; Andrew Lewis Maxwell, 1774 Grosvenor Place, Mississauga (CA) L5L 3V8

( * ) Notice: Subject to any disclaimer, the term of this patent is extended or adjusted under 35 U.S.C. 154(b) by 662 days.

(21) Appl. No.: 10/851,133

(22) Filed: May 24, 2004

(65) Prior Publication Data

US 2005/0262429 A1 Nov. 24, 2005

(51) Int. Cl.
*G06K 9/00* (2006.01)
(52) U.S. Cl. .................................................. 382/187
(58) Field of Classification Search ......... 382/186–187; 715/507, 200, 221–226, 235
See application file for complete search history.

(56) References Cited

U.S. PATENT DOCUMENTS

| 6,456,740 | B1 * | 9/2002 | Carini et al. | 382/187 |
| 6,707,466 | B1 * | 3/2004 | Van Sickle et al. | 345/641 |
| 7,054,509 | B2 * | 5/2006 | Rom | 382/306 |
| 2006/0233441 | A1 * | 10/2006 | Clary | 382/187 |

* cited by examiner

*Primary Examiner*—Daniel G Mariam

(57) ABSTRACT

A method, system and computer program for creating a digital workflow associated with the completion of a paper form is provided. An electronic clipboard includes a panel for receiving a paper form, a computer including a clipboard computer application, and an input device that completes the paper form with handwritten input data and also created digital signals corresponding to the handwritten input data. The computer application interprets the digital signal data so as to define digital input data, which corresponds to the handwritten input data. The electronic clipboard also includes verification/correction facility that enables the display of the digital input data and verification and correction thereof using a series of input devices provided on the electronic clipboard. The electronic clipboard is linked to a remote computer. The remote computer includes a forms creation and management application for the creation of the electronic forms, and definition of rules for processing digital input data includes in the various fields of the electronic forms. In a server implementation of the invention, the remote computer is an application server that provides access to a plurality of software utilities for processing the digital input data included in the electronic forms. The application server enables processes such as financial transactions associated with electronic forms, transmission of selected digital input data to other computer systems, and field level encryption. Another aspect of the invention is a point of sale device that include the electronic clipboard.

24 Claims, 10 Drawing Sheets

Sources of REVENUE

| WOWpad | WOWforms Server | WOWtraffic Manager | WOWtransaction Server |
|---|---|---|---|
| Hardware Sale / Wireless Royalty / Supplies / Service | ASP Hosting / Enterprise Licensing | Transaction Processing / Enterprise Licensing | ASP Gateway / API Licensing | ASP Hosting / Enterprise Licensing | Downstream Transaction Processing |

Figure 5

1965 Britannia Road, Unit 5,
Mississauga, Ontario L5M 4Y4
Tel: 905 542 1505 Fax: 905 542 1506

Name
Address
City
Prov. _____ Code _____
Daytime Phone ( ___ ) _____

Pool Shape

Dimensions

| Framing | ☐ X Frame ☐ A Frame ☐ Full top rail |
| --- | --- |
| Bottom | ☐ 2 stage ☐ concrete ☐ dura |
| Decking | ☐ 3" perimeter with bubble for diving pad |
| Back Fill | ☐ clear ☐ Weeping tile |
| Access | ☐ 1 m/c ☐ 2 m/c ☐ Fence removal |
| Liner | ☐ Standard ☐ Special ☐ Custom |
| Coping | ☐ 3 stage ☐ regular |

Accessories

☐ Board ☐ Lock in cover
☐ Slide ☐ Lights
☐ Baracuda ☐ Chlorinator
☐ Gas ☐ Electrical

| Payment Schedule | |
| --- | --- |
| Upon Signing | |
| Kit delivered | |
| Liner installed | |
| Total | |
| Accepted by | |
| Customer | |

Additions to original contract

Building Permit Application

| Summary | Amount |
| --- | --- |
| Base Price | |
| Heater | |
| Safety Cover | |
| Baracuda | |
| Accessories | |
| Machine Access | |
| Extra Concrete | |
| Resodding | |
| Refencing | |
| Gas | |
| Electrical | |
| Subtotal | |
| P.S.T. | $0.00 |
| G.S.T. | $5.00 |
| Total | $5.00 |

Method of Payment (Check One)     ☐ Customer     ☐ Prestige
☐ Check or Money Order Enclosed
☐ Purchase Order No. _____
Please Bill:    ☐ Visa   ☐ MasterCard   ☐ American Express Credit Card Number                                    Expiration Date Authorized Signature                                  Figure 7 a

(CITY OF TORONTO)

Vehicle license: ☐☐☐☐☐☐

Date: ☐☐☐☐☐  Time: ☐☐☐☐

Location ☐☐☐☐☐☐☐☐☐☐☐☐

Precinct ☐☐☐☐☐☐☐☐☐☐

Make: _____  Model: _____  Colour: _____

Parking Offense

| | Offense | Fine |
|---|---|---|
| ☐ | Parking in Tow Away Zone | $50 |
| ☐ | Parking in Handicapped Zone | $150 |
| ☐ | Parking in Fire Lane | $100 |
| ☐ | Parking in Prohibited Area | $50 |
| ☐ | Time expired on meter | $20 |

Officer Name ☐☐☐☐☐☐☐☐☐☐☐

Number ☐☐☐☐  Signature _____

Payment Information

Method of Payment (Check One)
☐ Early Payment Discount

☐ Check or Money Order Enclosed

☐ Visa  ☐ MasterCard  ☐ American Express

☐☐☐☐☐☐☐☐☐☐☐☐☐☐
Credit Card Number

☐☐ - ☐☐
Expiration Date

_____
Authorized Signature

Figure 7b

SYSTEM, METHOD AND COMPUTER PROGRAM FOR AN INTEGRATED DIGITAL WORKFLOW FOR PROCESSING A PAPER FORM

FIELD OF INVENTION

This invention relates generally to technologies that enable the digitization of data. This invention relates more particularly to technologies for digitally capturing data from handwritten data entry into printed forms, at the point of interaction.

BACKGROUND OF THE INVENTION

The most commonly used platform for manual collection of data is completion of a form. (The term "form," as used herein, refers generally to a document (electronic or paper based) that is organized into a plurality of fields for entry of data related to the plurality of fields. The data may include, for example, a signature, or a link to other data.).

It is desirable in many environments to digitize information entered into forms and provide this data to other computer systems. One example is a service person attending at a residence to process an order for a swimming pool. The services person generally fills out one or more forms containing fields for data related to service ordering, ordering of equipment and supplies, calculation of payment, scheduling of personnel, processing of deposits by credit card, ordering of follow up services calls and so on. This data is desirable from the perspective of the pool installation company's scheduling system, accounting system and so on. Other examples including medical consent forms, medical treatment order forms, parking tickets and so on.

Numerous prior art solutions exist that fully digitized forms and make them available on a wide variety of devices, including for example hand held devices. There are a number of disadvantages to these prior art technologies. First, the adoption of the digitized forms requires behavioral change in users changing the way the work, often radically. With numerous key user bases this behavioral change has presented a very significant barrier to the adoption of these digital technologies. Second, these technologies have been generally costly to adopt, particularly when considering the training required for the user base to adapt to the change in their workflow. Third, and perhaps most importantly, with most applications of the prior art technologies completion of forms based on digital input is generally significantly slower than filling out forms manually. This results in yet another important barrier to adoption.

Other prior art technologies are directed to digital data capture after the manual form has been completed by the user. These technologies generally required the scanning and processing of the forms using OCR technology. This solution, however, is costly in that significant resources are expended in data entry and data correction, even with improved technology. Significant costs and time delays are also incurred in the physical collection, transportation, handling, sorting and storing these paper based documents. Also, it is often desirable or required to obtain feedback on the accuracy of the digitized form data from the user who originally completed the form. This is often necessary, for example, in medical applications of the technology. Even if the time that has elapsed between the completion of the form and the feedback request is relatively short, recollection may be imperfect or the further burden on busy staff that is presented by the feedback request may be undesirable. Further the cots imposed on the system for verifying and re-entering data are significant.

What is needed therefore is a technology that is based on digital capture of data linked to manual handwritten completion of a form by a user, in real time while the form is completed.

Technologies directed at this manual/digital form of electronic form data capture are known.

For example, A.T. Cross Company markets a CROSSPAD™ 35, a portable digital notepad that digitizes and records pen movements using radio transmission. The CROSSPAD transmits the recorded pen movements to a personal computer for processing and analysis. Similar technologies have been developed by Pegaus, whose PCNoteTaker uses a similar technology to turn movements of the pen into a digital X-Y stream.

Technologies are also known that facilitate the electronic capture of data while a paper based form is being completed in addressing specific problems that arise during operation. For example, U.S. Pat. No. 6,660,482 issued to WorkOnce Wireless Corporation provides a "Method and System for Form Recognition and Digitized Image Processing" which discloses a solution for achieving alignment between a digital ink image of handwritten information on a form with an image of the underlying form.

What is needed, however, is an integrated solution that enables the capture and real time character recognition to electronic data from a traditional form at the point of data capture and that processes the data using a pre-defined electronic workflow. There is also a need for a solution that enables data verification as part of a single transaction simultaneous with the completion of the paper based form, to create an intelligent learning system.

BRIEF DESCRIPTION OF THE DRAWINGS

A detailed description of the preferred embodiment(s) is (are) provided herein below by way of example only and with reference to the following drawings, in which:

FIG. 5 is a flowchart illustrating an aspect of the method of the present invention including generating transactional revenue based on processing of a form using the tablet of the present invention.

FIG. 7a is a representative paper form created in accordance with the present invention for digital capture and processing of data.

FIG. 7b is a further representative paper form created in accordance with the present invention for digital capture and processing of data therefrom.

SUMMARY OF INVENTION

The present invention provides an integrated solution for completing paper forms while capturing and processing the data therefrom in real time. An electronic clipboard is provided that enables real data capture, conversion and correction of resultant digital form data at the point of entry. The digital form data is transferred on a secure basis for processing over a wireless connection. Alternatively, the digital form data is stored on the electronic clipboard and transferred to a computer later, for example, by means of synching utility.

A forms manager is associated with the electronic clipboard which enables the creation of an electronic form or smart form version of the paper form. The smart form includes a plurality of rules for digital processing the smart form, including for example the handling of associated credit card or debit card transactions.

In the preferred embodiment of the present invention, the electronic clipboard is linked for two-way processing with the computer (a desktop in one implementation, a server computer in another). Loaded on the computer (or on linked computers) is programming operable to extract the data contained in the forms, including the traffic information about where appropriate pieces of data should be sent. The server software of the present invention has the ability to process the forms, and forward the information to the appropriate software through a suite of interfaces for further processing. Traffic rules can be used to establish two way communications, so that for example, credit card transactions, or other interactions involving verification of data collected, can be undertaken. The server software will track transactions, process financial transactions and confirm the completion of these activities in real time through communicating with the device.

In another aspect of the present invention, a related business model is provided based on charges for transactions, with an enhanced transaction charge for those interactions requiring two way confirmation. To this end, an accounting/billing utility and reporting utility are built into the software.

The present invention therefore defines an end-to-end digital workflow that coincides with the handwritten completion of the paper form. The solution therefore offers the advantages of paper forms (such as ease of completion and availability of a reliable audit trail) in combination with the advantages of a fully digital, integrated workflow.

The solution reduces the costs associated with forms processing by eliminating steps required to realize electronic data acquisition from paper based forms and allows interactive 2-way communications when used in a mobile environment.

DETAILED DESCRIPTION OF THE INVENTION

Figure 1:
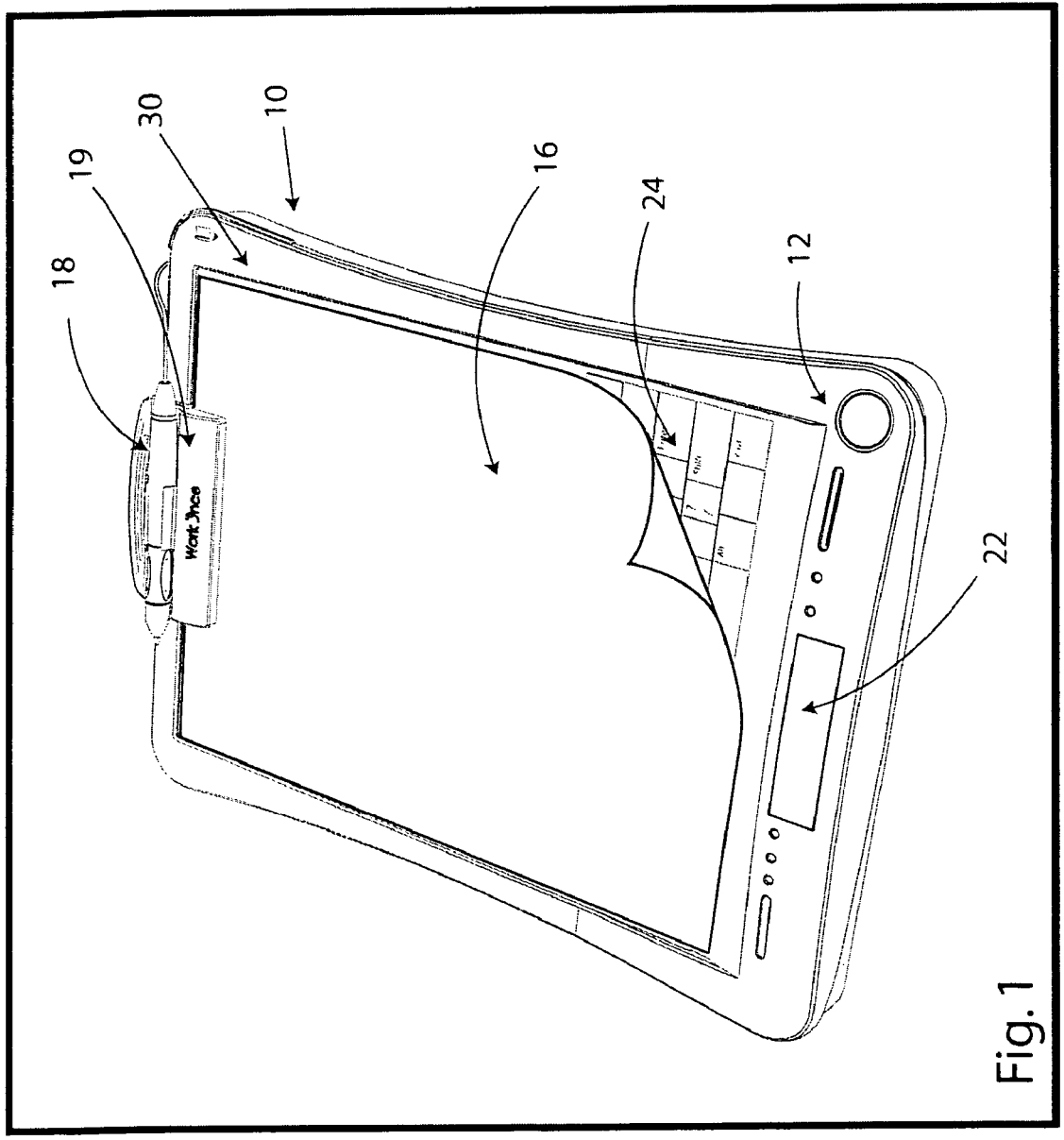
FIG. 1 is a representative illustration of one aspect of the present invention consisting of the tablet of the present invention.

One aspect of the present invention is the electronic clipboard (10) of the present invention, illustrated in FIG. 1. The electronic clipboard is provided using known hardware and software components. One aspect of the present invention is that the electronic clipboard (10) is designed and configured, in a manner that is known, such that its hardware, software and/or memory capabilities can be readily upgraded where required or desired for particular implementations of the invention (for example if biometric security is required then a fingerprint scanner. can be easily added, the same for GPS or photo input).

The electronic clipboard (10) includes a microprocessor (not shown) and memory (also not shown), as well as a number of other utilities typical of electronic clipboard devices, provided in a manner that is known.

The representative embodiment of the electronic clipboard (10) of the present invention includes:

1. A clipboard body (12) that includes an attachment device (14) such as a clip to hold a paper form (16) in place.
2. A pen (18) which is operable to mark the paper form (16), but also to send a digital signal to the clipboard application (20) (illustrated in FIG. 3b). As particularized below, the clipboard application is operable to: (a) capture a digital "carbon copy" of the paper form (16) based on the movements of the pen (18) so as to create a digital image of the paper form (16); (b) convert the digital image using character recognition technology to an ASCII text version of the data input by the user to the paper form (16).
3. A display (22) is operable to display the ASCII text version referred to in (2) above, as interpreted by the clipboard application (20). The display (22) enables the user to review the digital data captured by the form on the fly. The display will also facilitate the transmission of information and instructions to the user, such as providing help, identifying problems or connecting thorough SMS protocols. The display (22) consists of, for example, a known LCD display.
4. The purpose of the display (22) is to enable the user to make corrections on the fly using a suitable input device. This has the benefit of making corrections contemporaneously with the completion of the form, rather than at a later date when the user may have imperfect recollection or it may be difficult for them to address their mind to providing input necessary for corrections, or confirmation of accuracy of corrections. An added benefit of the fact that the corrections are processed at the point of entry by the present invention is that, in another aspect of the clipboard application, the corrections made on the electronic clipboard (10) enable the clipboard application (20) to learn from the corrections to reduce errors in the future, in manner that is known. In a particular implementation of the present invention, the input device consists of a soft alphanumeric keypad (not shown. in FIG. 1) which is located on the top of the electronic clipboard (10) and is accessed by the user lifting the bottom of the paper form (16).
5. The electronic clipboard (10) also includes two communication facility consisting of interface protocols (not shown) that enables the electronic clipboard (12) to communicate with the server (26) of the present invention, or the desktop computer (28) (illustrated in FIG. 2. In a first example of an implementation of the present invention, the clipboard (10) uses wireless (80211 or GPRS/GSM) or wire communications (Ethernet) technology to communicate directly or indirectly (through a local P.C.) with the server (26) (over the internet). In a second example, the clipboard uses wireless (Bluetooth or Infrared) or wire communications (USB, Ethernet etc) to download directly to an individual computer such as the desktop computer (28) for local data storage. The communications technology included in the electronic clipboard (10), in one particular embodiment thereof, includes at least one USB port and one dedicated port for hardwire connection to the desktop computer (28), this could also be via a docking station for example.

6. The preferred embodiment of the present invention also includes a known swipe card (30) for swiping a credit card, health card or debit card, for example.

It is also desirable that the electronic clipboard (10) include means for positive position verification so that the clipboard application (20) can determine which field in the electronic form corresponding to the paper form (16) a particular entry on the paper form (16) made with the pen (18) relates. By way of illustration, the electronic clipboard (10) of the present invention utilizes. the position verification described in U.S. Pat. No. 6,660,482.

Also, the representative embodiment of the electronic clipboard (10) of the present invention also includes or can be fitted to include:

Smart controls and a scroll button for navigating to selected text of data captured by the clipboard application (20) and displayed in the display (22).

A biometric authentication device such as a finger print bio sensor.

One or more speakers.

Compact flash.

A microphone.

And so on.

In one aspect thereof, the clipboard application includes an ASIC based handwriting character recognition engine that provides fast, near real-time algorithm processing on the electronic clipboard (10).

The data captured and converted by the electronic clipboard (10) is either stored in the local memory in the clipboard, or preferably is transmitted by means of a secure wireless connection (provided in a manner that is known) to the server (26) of the present invention. The data transmitted from the electronic clipboard (10) is securely encrypted so that it can be safely and securely sent over the Internet, and can only be un-encrypted by the server application with the appropriate encryption key and/or authentication data.

Figure 2:
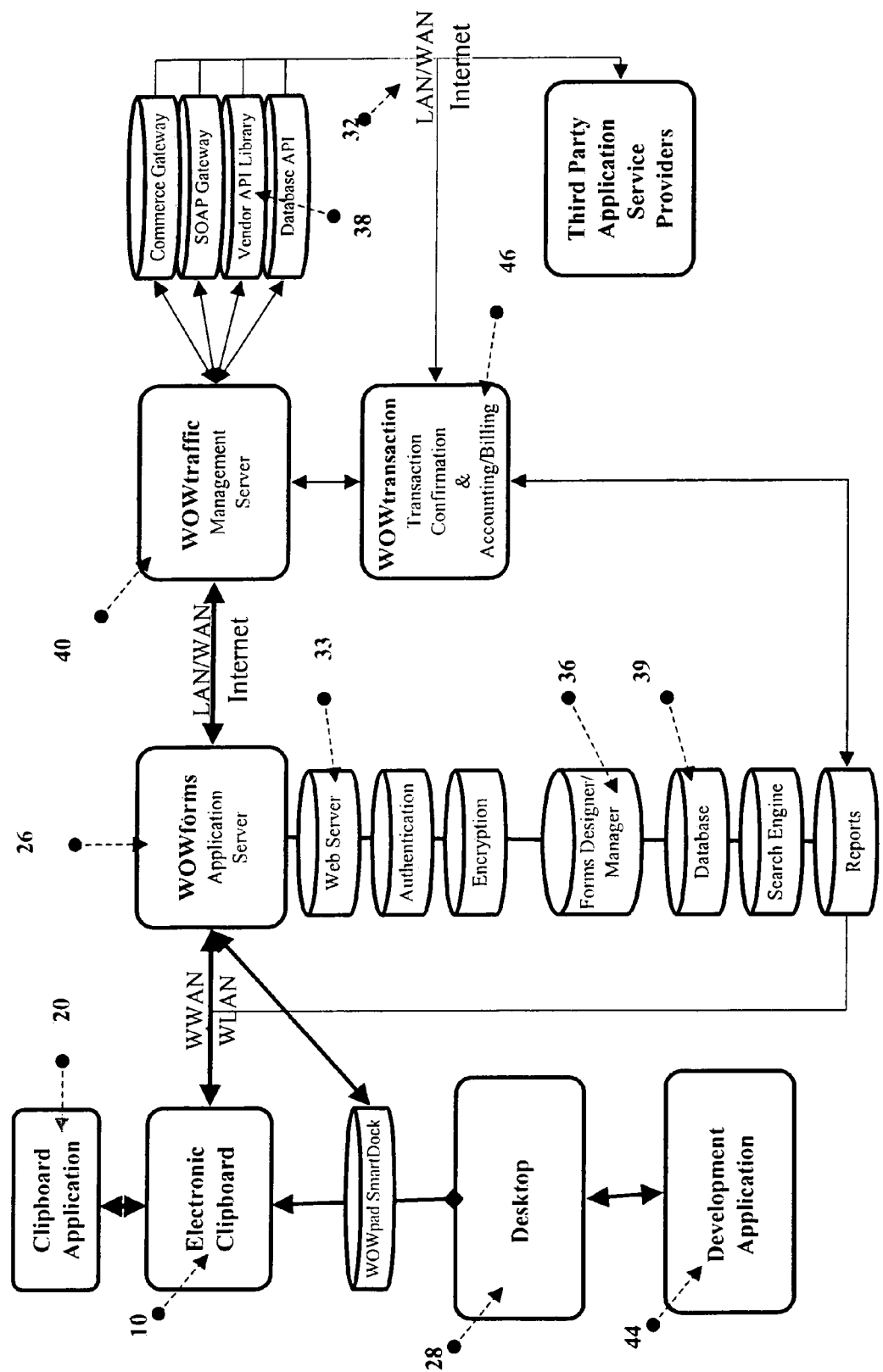
FIG. 2 is a resource diagram illustrating the resources of the system of the present invention.

FIG. 2 illustrates the system of the present invention. The electronic clipboard (10) is linked to the server (26) or Application Server (in one embodiment thereof), preferably by means of a wireless connection such as a Wireless Wide Area Network or a Wireless LAN (32). The Application Server (26) includes a web server (33). The server (26) includes a database server (34) that preferably provides a secure repository for data transmitted by the various electronic clipboards (10). The database server (34) restricts access to users only to their own data, in a manner that is known.

Figure 8:
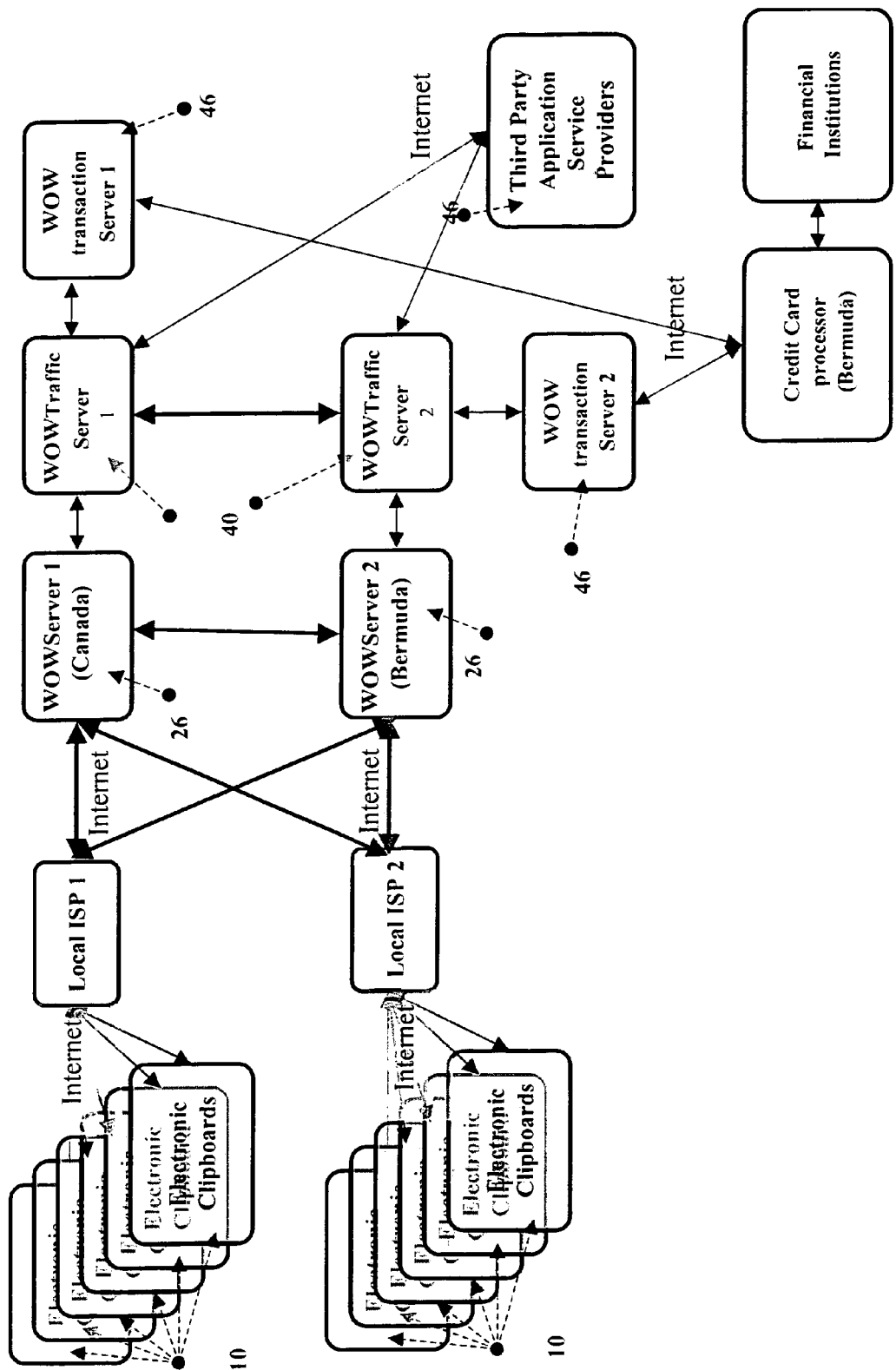
FIG. 8 is a diagram of the servers and the processing of communication rules.

As shown in FIG. 8, the configuration of the server (26), including the traffic server (38) and the communications rules embedded in the electronic form are designed to operate in a redundant system environment, in a manner that is known. This means that should there be a problem, with gathering, collecting and processing data at one location, the other remote location can be utilized.

The Application Server (26) is also linked to a forms manager (36) consisting of a management application suite that enables the design of forms supported by the solution of the present invention.

The forms manager (36) provides a series of known user interfaces for defining the workflow, in accordance with the present invention. This workflow includes the definition of an electronic form or smart form corresponding to a particular paper form (16), as well as the rules (field by field) for processing the same.

The forms manager (36) creates the electronic form based on a plurality of "smart fields" defined by two principal components: (1) Properties and (2) Preferences. Properties define field formatting and validation requirements, while Preferences define workflow in relation to the Traffic Server (38) described below.

Upon creation of a smart form, the user must define the field Properties by operation of the forms manager (36), including the following:

Field Label—Name, Address, etc. . . .

Field Type—text, number, date, time, image, calculation

Field Formatting—Check Box, Radio Button, Auto Text (1=Yes, 2=No, 3=Maybe . . . ), character length (min, max), font format (size, bold, italic, etc. . ), auto format (MM/DD/YYYY, Caps, Small Caps, etc. . . . )

Field Options—Auto Enter (date, time, serial number, data, lookup, calculated value, etc. . . . ), Data Validation (strict data type, not empty, in a range, Max # of characters, etc. . . . ), Repeating Field (same field name with repeating entries such as a parts list, or invoice line item)

The derivative of these defined Properties is a smart form definition profile that is used by the electronic clipboard (10) for defining data capture field values, character recognition and data formatting rules, while the Application Server (26) uses this information to define the data management schema and storage requirements.

The integration of the properties field into the smart form, severely constrains the variations in data input and the possible outputs, allowing speedy, real time verification of characters. This has the benefit of improved accuracy, reduced response times and lower processing power requirements.

The Preferences relate specifically to pre-defined traffic 'objects' that are created using the Application Programming Interface or API Library (38) linked to the traffic management server (40). Data that is required to be passed on to third party corporate databases, commerce gateways or to third party CRM/ERP/Accounting applications must be pre-defined for location, method and format for the data exchange. The Preferences interface allows the Form designer to select the appropriate values needed to process the data via the traffic management server (40). Each such traffic object is generally comprised of three components: an API; a Field Definition and Remote Data Verification, defined in a manner that is known.

Since each smart form generally includes multiple fields, for each of which there may be a separated destination that the data contained in that field is to be processed to, there is no limit to the number of traffic objects that can be used in a single smart form. The API defines the remote system that will be processing the smart form, the Field Definition is the field that is expected by the remote system (i.e.: Customer ID, Address, etc. . . . ). It is generally required that there be a field defined on the smart form that corresponds to the field definition on the traffic object. Finally, the Remote Data Verification determines whether or not the remote system will pass back a value in real-time to the electronic clipboard (10) or a confirmation notice to the Billing/Accounting server or simply a handshake confirmation that the data was received successfully (i.e.: Confirmed or Failed).

The following represents an example of the forms manager (36) in operation. A Sales Order form is created for a pharmaceutical company. The sales rep has completed a sales call and fills out the form which includes requirements for restocking of existing inventory and free samples of a new product. When the order is completed and forwarded for processing, there are traffic server objects that are used to process the data. The first is an SAP API which will take the entire order (except the Free Samples line items) and pass the data to the company accounting and inventory system. The second API will pass the client information and sales summary information to the SalesForce.com API which is used by the sales team to track calls and closing ratio's, and finally the sample order information will be passed to an ORACLE API which is used by the Product Marketing group to track samples so they can follow up on their market research.

The present invention also contemplates a desktop application (44) loaded on the desktop computer (28). As illustrated in FIG. 3b, the desktop application (44) provides features corresponding generally to those of the Application Service Provider (26), but typically in a "LITE" implementation thereof. The desktop application is used to manage the clipboard application (20), and includes a utility corresponding to the forms manager (34) described above.

Figure 3A:
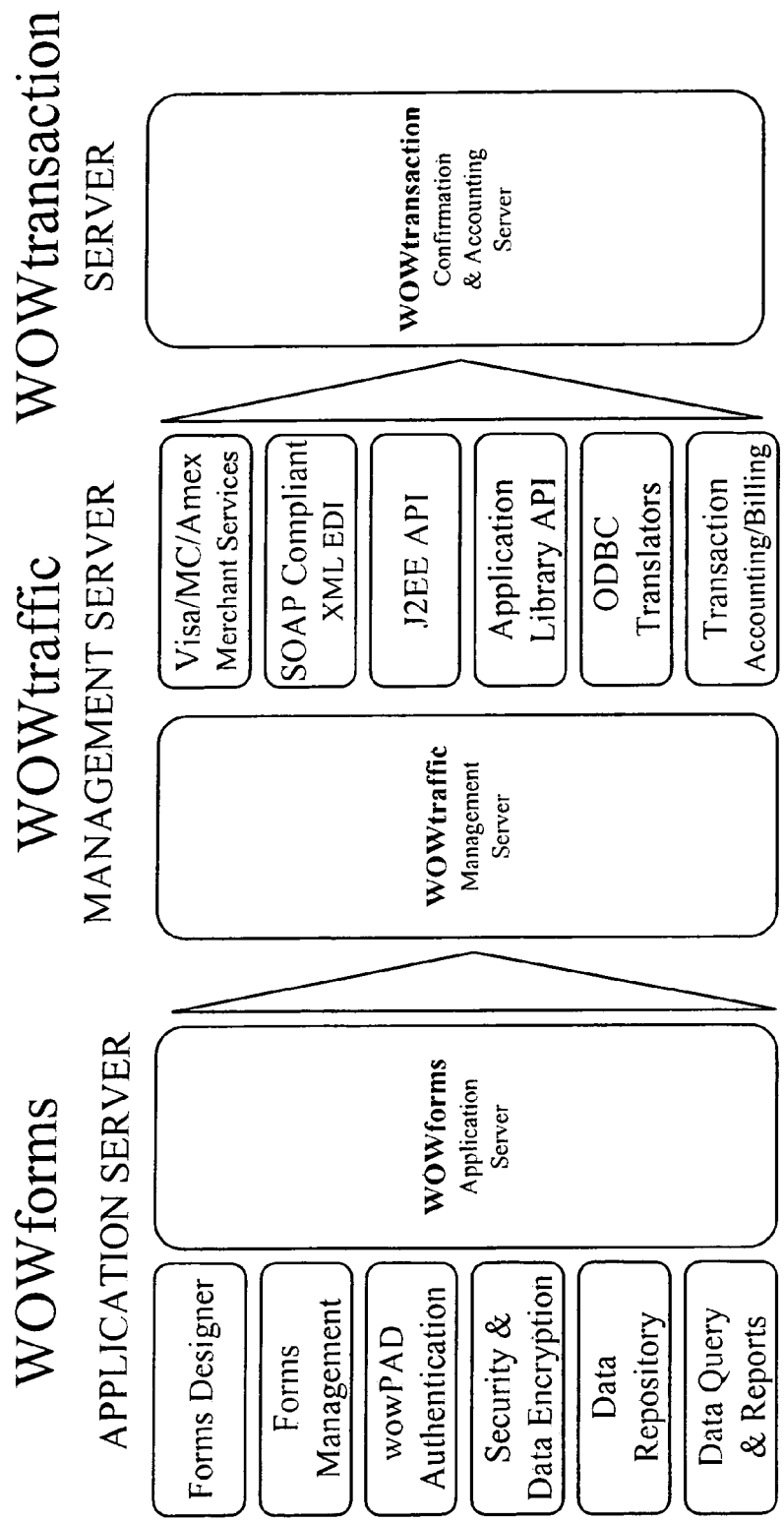
FIG. 3a is a program resource diagram illustrating the principal resources of one aspect of the computer program of the present invention consisting of a server application.
Figure 3B:
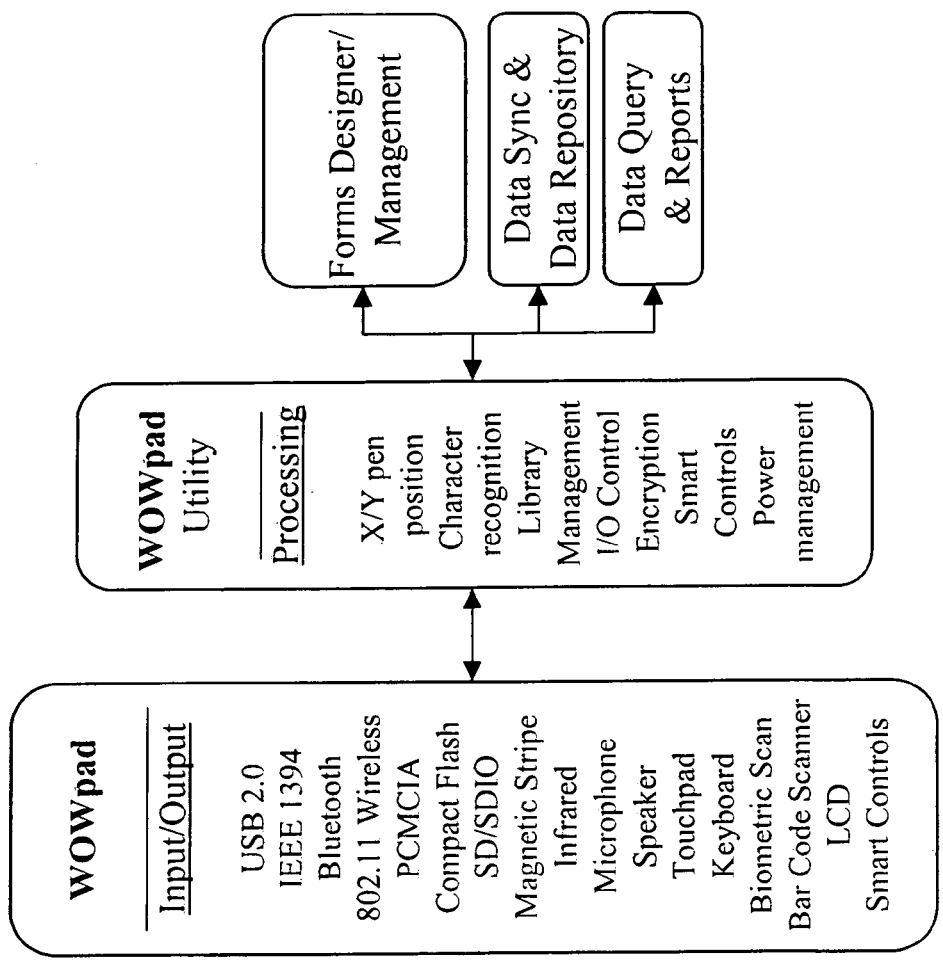
FIG. 3b is a program resource diagram illustrating the principal resources of another aspect of the computer program of the present invention consisting of a desktop application, and further illustration of the resources on the tablet, in one embodiment of the invention.

As best illustrated in FIG. 3a, the traffic management server is linked to the Application Service Provider (26) and enables smart routing functions (as mentioned above) and in particular connects the Application Service Provider (26) to other networks and systems using several gateway functions such as commerce transactions using Merchant VISA/MasterCard, data exchange using SOAP/XML, a JAVA based Application Programmers Interface (API), an application library API which provides a specific set of standards for particular legacy systems such as PeopleSoft, SAP, SAS, Siebel, Oracle, etc. . . . ,and finally, a set of ODBC Translators allowing data to be routed directly into corporate databases.

FIG. 3b illustrates the resources of the computer application of the present invention loaded on the desktop computer, in another embodiment of the present invention.

Figure 4:
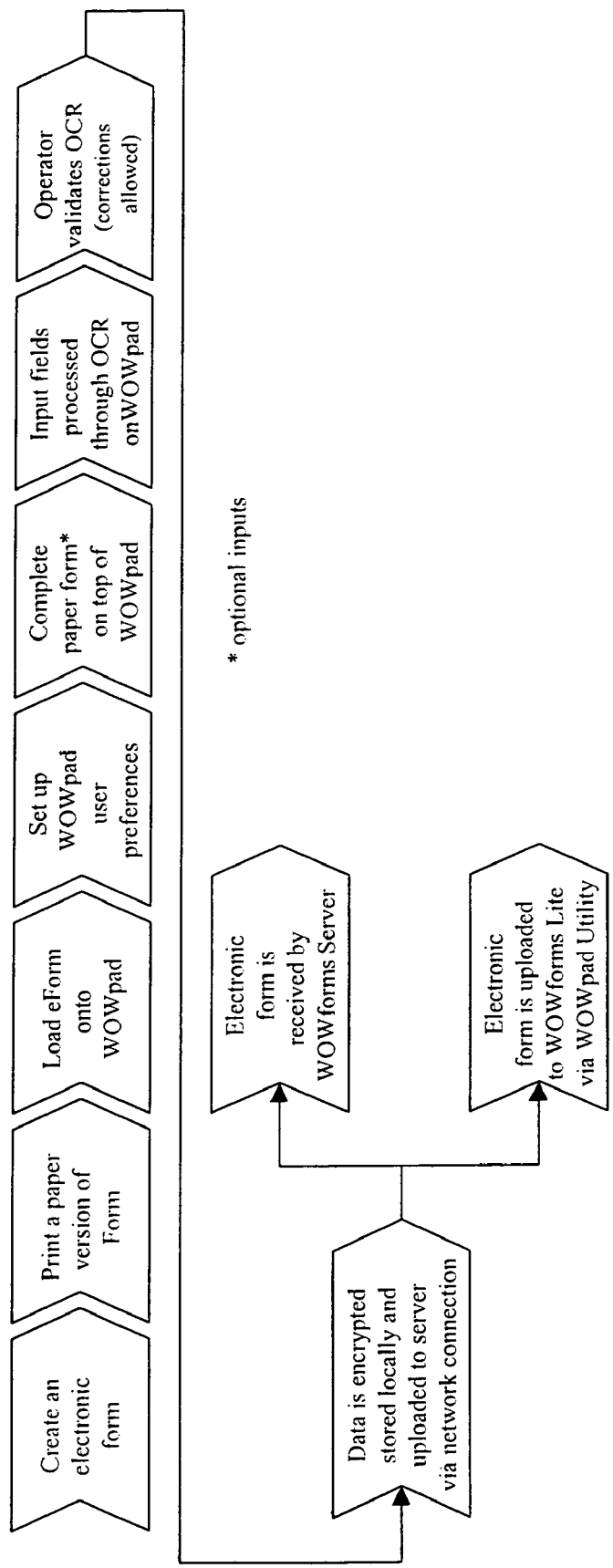
FIG. 4 is flowchart illustrating the steps involved in capturing data electronically in accordance with the method of the present invention.
Figure 6:
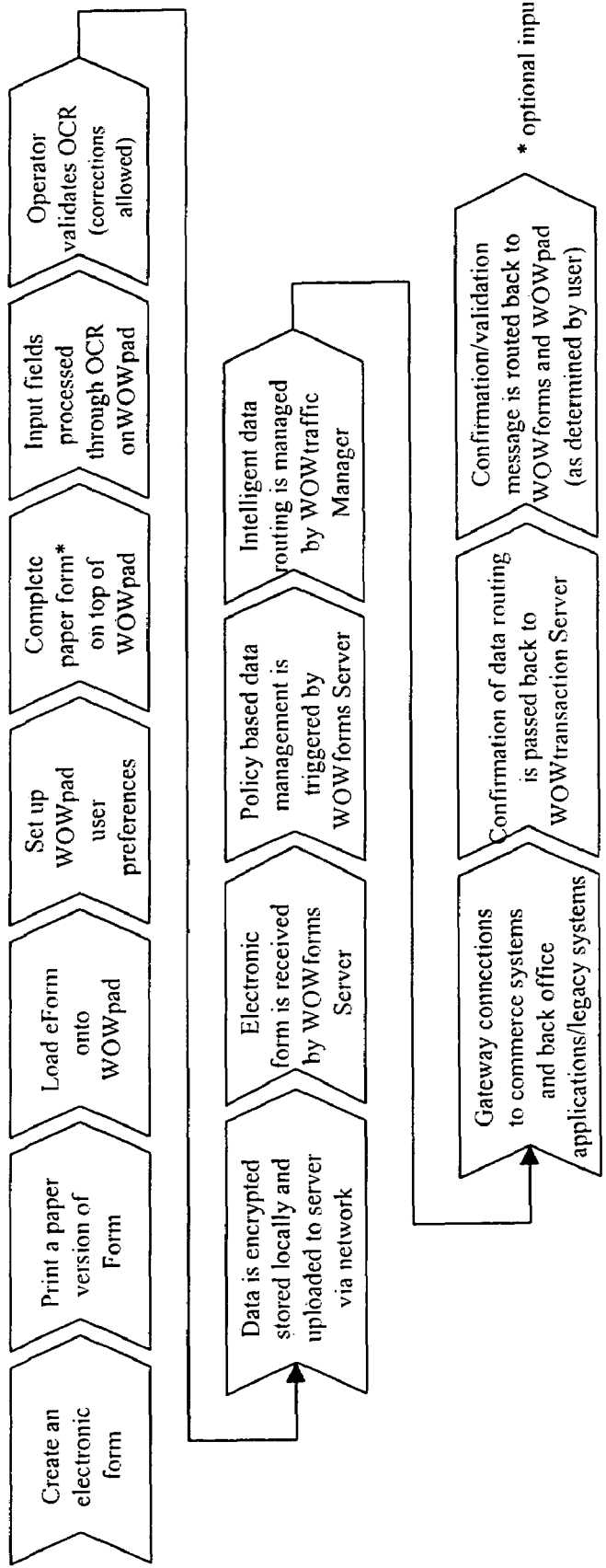
FIG. 6 is a further flowchart illustrating the method whereby the invention is configured to provide end-to-end security.

FIG. 2 also illustrates the transaction server (46) linked to the traffic management server (40). The transaction server (46) functions as a verification agent for all Smart Routed data which can be used to track and manage transaction based revenues (as explained below), returns Real-Time confirmation notices to the electronic clipboard (10), and interfaces with the web based reporting tools for billing/accountability to the end user FIG. 4 illustrates the data capture workflow associated with the electronic clipboard (10), in one aspect of the method of the present invention.
Create an electronic form using the forms manager (44) (whether the web based tool provided by the Application Service Provider (26) or the PC 'Lite' version of the application provided by the desktop application (44)). The following consist of the stages involved in creating a smart form in accordance with the present invention:
Create a smart form (each smart form is given a unique identification number).
Choose paper size (Letter, Legal, Custom).
Place a scanned image if using an existing printed form or turn on alignment grid.
Using the object library tool, drag and drop pre-defined fields onto the form.
Adjust the size and location of the fields.
Set the field properties by double clicking on the fields.
Set Data Format Properties.
Set Data Validation Properties.
Set Smart Routing Properties and Smart Actions.
Add lines, borders logos and other design elements to the form.
Save.
Print the smart form to local printer or save as .PDF to send to a commercial forms printer.
Turn on the electronic clipboard (10), for example, by removing the pen (18).
Connect the electronic clipboard (10) to the desktop computer (28) to the Application Server (26) and thereby downloading the specified smart form onto electronic clipboard (10).
Set up the electronic clipboard (10).
User ID, Form ID, Smart Controls (hot keys)
Place paper form onto electronic clipboard (10).
Select the corresponding electronic form, for example, by operation of the smart controls.
Complete the form using the pen (18) and other data capture input devices.
Written data will be converted to ASCII text by operation of the clipboard Character Recognition (CR) application (20). The CR's data can be verified and corrected using the smart keypad and associated navigation tools in conjunction with the LCD display (22)
Data is encrypted, saved locally and can be uploaded to the server (26) by operation of the wireless connection referred to above.
Smart Field verification and validation can occur in Real-Time where the electronic clipboard (10) is network enables.
If the electronic clipboard (10) is not network enabled, uploading and verification of smart field data stored to the memory of the electronic clipboard (10) will occur when the unit is docked to the desktop (28).
The User determines if data is routed to server (26) or the desktop (28).

Form Completion
The pen (18) is used to complete the fields indicated on the printed form (16).
As the fields characteristics have been specified, completing character recognition, one character at a time, is relatively easily achieved, by operation of the clipboard CR application (20).
Results of the character recognition are viewed in real time in the LCD display (22).
Mistakes can be rectified using the smart controls, touch pad (24) or the smart pen (18).
Using the smart controls, the text with the error is located in the LCD display (22), using the smart controls or the scroll button. The paper is then lifted and the correct character or characters entered in the correct location using the touch pad (24).
Alternatively the erase button on the smart pen (18) can be activated, the pen (18) used to white out the original error and then deactivated and the correct character or characters entered.
Changes can be indicated on the. paper form (16) if required
Increased accuracy of character recognition can sometimes be achieved by providing an initial training session for the user to populate a library, by providing additional libraries of information: in the electronic clipboard (10) of the present invention (for example by an enhanced dictionary function), by accessing the correct data wirelessly or by creating an intelligent character recognition engine which can be trained to recognize a specific users writing, the engine being provided on the electronic clipboard (16) and learning based on the correction function.
Additional functionality can be provided, by using the mobile activated mode, to achieve real time interactive transactions. Data can be sent (when a field is completed, and based on the smart rules) for verification and processing through the Application Server (26) and the traffic management server (40). Confirmation of the transaction can then be sent back to the electronic clipboard (10) and displayed on the LCD display (22).

Specific fields can be designated for drawings or secure signatures where appropriate, in a manner that is known. Field based encryption rules can be adopted based on specific applications and mandated requirements. Specific parameters for field based encryption, including for example the specific encryption technology and/or standard to be used, can be selected and incorporated into an electronic form based on operation of the Properties. For example, by this method, a user may select from a range of available encryption technologies, such as synchronous or asynchronous encryption technologies from a variety of vendors such as RSA™, ENTRUST™, or others. The field level encryption may occur on the electronic clipboard (10), the server (26) or both, by operation of the Properties.

As mentioned earlier, the electronic clipboard (10) includes a number of unique technology features which enhance the value of the process. These include:

Biosensors to verify either the user or the customer involved in completing the form Microphone/Camera for capturing audio/video data at the same time as the basic form.

Swipe card (30) or Bar code reader/RFID reader for capturing data about people or products in a real time environment Time/Data/Location stamps to confirm basic details around the capture and completion of the form.

FIG. 5 shows the data processing features of the Application Server (26), the traffic management server (40) and the transaction server (46), in one particular embodiment of the present invention.

Data is captured and processed by electronic pad (10) and electronic data is uploaded to the Application Server (26) for processing.

Encrypted data is stored in the memory of the electronic pad (10) and can be organized by individual, department or company based on preferences established by the electronic pad user Policy based Smart Routing will be invoked by the Traffic Management Server (40).

Smart Routing will route encrypted data from the Application Server (26) to an alternative application or gateway for data authorization, validation and commerce transactions.

Multiple gateways and sophisticated data routing schemas can be triggered from a single form.

Confirmation from remote systems will be received by the Transaction Server (46).

Transaction based revenue occurs on each leg of the upstream and downstream traffic that passes through the gateway is contemplated. For example, if smart routing passes data from the form to 3 destinations and a confirmation message is required back on the commerce transaction—that represents 4 separate transactions [3 upstream and 1 downstream]. A confirmation is required for all smart routing but only those that require a Real-Time response or confirmation number will be charged for, i.e. 2 transactions.

One aspect of the present invention is a business model which consists generally of carrying or subsidizing the infrastructure costs (cost of electronic clipboard (10) as well as access to the resources linked to the Application Server (26) for forms creation and processing) is funded based on a per transaction cost (particularized below). This per transaction cost is defined, for example, as a per form processing cost that is lower than the demonstrable per form processing cost using prior art technologies. The business model of the present invention represents significant saving to an enterprise adopting the mobile paper solution of the present invention. The following illustrates the saving realized in accordance with the invention:

1. Data entered into the form is verified at the point of entry-reducing the amount of time wasted in going back to the enterer or the customer to verify data not entered correctly.
2. Completed forms do not have to be transported back to the office-reducing the cost associated with sorting, collecting and transporting the documents.
3. Forms do not need to be received, handled, stored at the office-reducing the labour costs associated with the physical handling of the completed forms within the recipient's office.
4. Forms do not need scanning-reducing the cost of handling the forms being entered and the cost of scanning itself.
5. Scanning errors reduced-reducing the number of forms which have to be manually verified and the subsequent rework.
6. Process delays are significantly reduced-improving cash flow and customer service.
7. The number of documents lost through the process is substantially reduced-the cost of rework is significantly reduced.
8. Ease of collection of additional data increases utility-reducing the cost of collecting data from a variety of sources.
9. Real time verification of forms data-reduces the number of incorrect forms completed and the associated rework.

Based on this there is a significant savings in material handling and other costs which is the basis for business model of the present invention. By basing the charge to the client on a per transaction basis, the focus of the mobile paper solution of the present invention becomes providing a "Return on Investment" rather than device cost.

WorkOnce will base its agreement with clients on the following four charges:

the Provision of electronic clipboards (10) to each mobile worker ($ per employee).

the establishment and operation of the Application Server (26) per organization ($ per company).

the transmission of data from the electronic clipboard (10) to the portal provided by the Application Server (26) through the portal ($ per form).

the provision of valid return data confirming transaction ($ per additional revenue earned).

In another implementation of the present invention, the server application of the present invention (described in association with the Application Server (26)) is licensed for installation at customer sites, when there is a logical benefit to self management. This will be particularly appropriate where the collection of data is fully integrated into the main databases of the company, where there is significant two way interaction as the form is completed, or where security requires minimal access to data externally. In this case, there will be a component of each of the four charges maintained in the license model, but the enterprise cost will rise and the cost per transaction will be reduced.

Other implementations of the present invention are possible:

(a) Individual users who will purchase the electronic clipboards (10) and a light version of the software of the present invention, and use in either a standalone or wireless opportunity.

(b) OEM organizations who wish to license the clipboard application (20) and the forms manager (36) and the Server/

Traffic solutions software described above (perhaps with certain hardware components). Such an organization would then have the ability to build and deploy the mobile paper solutions described herein for their enterprise customers.

(c) Other revenue opportunities can be linked to the mobile paper solution of the present invention including forms design, data archiving and provision of wireless services. Each can improve the overall viability of the organization.

1. Another aspect of the present invention is a credit card processing system, which while providing the reliability of a paper trail (by means of a paper form (16) consisting of a credit card slip), also provided real time integrated digital processing.

The attributes of this system are:
   a. It allows the numbers on the card to be entered by hand, and then automatically converted to data for subsequent processing (either in real time with online transaction verification or batch processing at the of the day).
   b. It stores the signature information digitally, at the time of data collection, for subsequent audit or verification purposes, without the need to keep a back up piece of paper.
   c. It allows transaction data, including drawings, order information plus other inputs (such as location, time and place) to be integrated into a single electronic format
   d. It allows the point of real time customer interactions to be distributed in a geographic location using local wireless infrastructure to link into data processing systems (i.e. processing complex orders in a retail showroom).

The present invention also enables the creation of legally binding transactions, which require both paper documentation and a signature. In certain cases the standard data can be augmented by using the enhanced technology functionality available in the electronic pad (10). Such transactions may include:

1. The completion of an insurance form requiring a signature.
2. The completion of an accident report including addition of a picture (using optional camera).
3. The completion of a house purchase involving a time and date stamp.
4. The completion of a police evidence report, requiring a time, data and location stamp (using optional GPS).
5. The completion of a statement, requiring confirmation that both the police officer and the provider of the statement were both present, through the addition of finger print information (using optional biometric reader).

Further Examples in Operation

A. Example of the electronic clipboard (10) of the present invention in a non wireless environment.

Completion of a swimming pool quote by contractor (see example form attached as FIG. 7a)

1. Creation of Smart Form

The SmartForm is designed online using the forms manager (36) as explained above. Fields used will include:
   a. Name, address, contact information
   b. Date of quote
   c. Start and completion date for work
   d. Options for pool selection
   e. Drawing of pool shape
   f. Electrical, gas and landscaping information for sub-trades
   g. Price
   h. Deposit information (including credit card payment and signature)

2. Inclusion of Smart Rules:

Each of these fields will include certain rules around the field properties, such as the nature of the characters or fields being entered (i.e. text, numeric, picture), the rules of the text (date should be today's date, completion date should be after start date), any smart rules, (i.e. whether a field is required or optional) and smart traffic (preferences) rules which can be applied at the field level, (such as credit card information to credit card company, pool dimensions to pool manufacturer, relevant sub trade information to sub trade, permit application to City).

3. Downloading of electronic form:

In this case the web based print form (PDF) (16) and the smart form are downloaded to the desktop computer (28). The print form (16) is printed for subsequent completion on site. The smart form (the electronic version of the print form (16) created by operation of the forms manager (36)) is downloaded to the electronic clipboard (10), in this case over the wireless connection (which is an infrared connection).

In other cases the form may be printed off site and sent to the user from the printer. Also the smart form might be directly downloaded to the electronic clipboard over the wireless connection which is an embedded 80211 wireless card, or an Aircard (not shown).

4. The paper form (16) is placed on the electronic clipboard (10) and aligned by verifying two touch points with the pen (18), by operation of the positive position verification mentioned above.

5. The paper form (16) is then completed, one field at a time. A graphic representation of the handwriting will be displayed in the LCD display (22) as it is entered. As the next field is entered, the characters from the previous field will be converted to text using handwriting character recognition. If there is a validation error, there is an audible alarm.

6. Corrections are made as explained above.

7. Once all the data has been entered, including the drawing of the pool shape, and the credit card information signed, the written document is given to the customer.

8. When the pool company returns to the office the data from that job (along with any others completed in the day), the form is downloaded through the desktop computer (28) to a web site linked to the web server (part of the Application Server (26)), where the smart traffic rules (preferences) are applied. (In this case we assume that there is no need for a second level of validation, which could be available if required). Some of these smart rules would include sending the following information to the following recipients, in most cases the name and address would be included each time:
   a. The name and address and order information to the pool company's file
   b. The pool description, size, color etc., and due date to the pool manufacturer (may include drawing)
   c. The installation date and specification to the contractors
   d. The drawing and installation dates to the landscaper and installer
   e. Appropriate details to the City for the permit
   f. Credit card information (number, expiry, name, amount to the credit card company) to the financial institution. Verification of funds transfer would then be sent back to the company.

At this stage the main transaction would be basically complete, with the management of the installation now required, and a final payment for the next steps, made using the WoW SmartPad at the appropriate times.

At each stage of the follow up the transaction, the appropriate organization would clearly know what was required from them to complete the overall installation. Information would be forwarded to each party in a timely fashion and repetitive data input would be eliminated. This simplified tracking system would provide a degree of administrative support to organizations otherwise struggling to stay on top of the administrative part of their activities.

B. Example of the operation of the electronic clipboard (10) in a wireless environment.

Completion of a parking ticket by a law enforcement officer (see example in FIG. 7b)t 1. Creation of a smart form.

The smart form would be designed by the original forms company and made available to the law enforcement office. It would contain the following information:
   a. Name, address,
   b. Date and time
   c. Make, type, license plate of vehicle
   d. Details of offence (including fine)
   e. Law enforcement officer details
   f. Payment details 2. Inclusion of smart rules, by operation of the forms manager (36):

Each of the fields of the paper form (16) will include certain properties rules, such as the nature of the characters or fields being entered (i.e. text, numeric, picture), the rules of the text (date should be today's date) and smart rules, (whether a field is required or optional). In addition each field will contain and smart traffic preference rules (such as whether vehicle has other outstanding tickets, a valid permit to park in that location or is stolen).

3. Downloading of electronic form:

In this case the form would be preloaded onto the electronic clipboard (10), and a quantity of preprinted forms given to the law enforcement officer.

4. The parking ticket form (16) is placed on the electronic clipboard (10) and aligned by verifying two touch points with the pen (18), by operation of positive position verification, as particularized above.

5. The paper form (16) is then completed, one field at a time. A graphic representation of the handwriting will be displayed in the LCD display (22) as it is entered. As the next field is entered, the characters from the previous field will be converted to text using handwriting character recognition. If there is a validation error, there is an audible alarm.

6. If the user wishes to correct a piece of data input, then corrections are made as described above.

7. At the point where the address is entered, the smart traffic rules would immediately use the wireless link to see if a valid existing parking permit had been issued for that vehicle/location. If it had, then the whole form would be cancelled, if not then the LCD display (22) would indicate approval to proceed.

8. In certain jurisdictions the system might be used to verify in real time the number of outstanding tickets which had already been issued to a specific vehicle, so that more extreme actions can be taken. Alternatively the system can be used to rapidly verify if the vehicle is stolen.

9. Once the paper form (16) had been completed, then it would be transmitted to the main system dealing with parking tickets instantly, so that subsequent online payment and follow up could be dealt with expeditiously.

10. The paper version of the ticket could then be attached to the offending vehicle.

11. If the owner returned to the vehicle at this time and wished to pay the ticket at once, they could simply provide a credit card number, expiry date and signature and deal with the whole matter. If not the standard follow up system would be deployed.

12. The system would significantly reduce the current manual workload involved in collecting the forms, sorting them, re-entering them in the computer. It would reduce errors, increase speed of response and probably improve cash flow. In addition the additional functionality envisaged would have substantial non financial benefits for the parking enforcement agency such as reduced incidence of tickets being issued to cars with permits, speed of response of getting information on web site and simplified performance measurement.

Other extensions of the present invention are possible without departing therefrom. For example, the unit can be used to provide time and date verification of the completion of legal documents. With the addition of a GPS positioning board and a biometric sensor, the location and presence of people at a specific time and date can be verified.

We claim:

1. A method of providing a digital workflow associated with the completion of a paper form comprising the steps of:
   (a) Providing at least one paper form, the paper form including a plurality of fields for receiving handwritten input data;
   (b) Providing an electronic form corresponding to the paper form, and including a plurality of rules for processing the input data;
   (c) Completing the paper form with handwritten input data with an input device that enables the capture of the input data in electronic form to define digital data; and
   (d) Displaying the digital data for verification and/or correction of the digital data at the point of entry by operation of a verification/correction facility provided by the input device; and
   (e) Processing the digital data in accordance with the rules.

2. The method claimed in claim 1 comprising the further step of enabling interactive communication between the input device and a remote computer system.

3. The method claimed in claim 2, comprising the further step of creating the electronic form on the remote computer system by operation of a form creation computer application linked to the remote computer system.

4. The method claimed in claim 3, whereby the rules for processing data define:
   (a) Traffic information defining one or more third party computer systems to which particular digital data is transmitted for processing;
   (b) Transaction data defining one or more credit/debit card transactions associated with the electronic form;
   (c) Verification of the digital data by operation of a remote computer linked to the electronic clipboard;
   (d) Real time processing of specific digital data to enable rapid processing thereof; and
   (e) Encryption protocols defining the secure processing of particular digital data at the field level.

5. An electronic clipboard apparatus for providing a digital workflow associated with the completion of a paper form, the electronic clipboard comprising:
   (a) A panel for receiving a paper form;
   (b) A computer linked to a memory, the computer being operable to receive computer instructions defining a clipboard computer application, the computer application being operable to process an electronic form corresponding to the paper form;
   (c) An input device operable to complete the paper form with handwritten input data and create digital signals corresponding to the handwritten input data, wherein the computer application is operable to interpret the digital signals so as to define digital input data, said digital input data corresponding to the handwritten input data; and (d) A verification/correction facility linked to the computer application, a display and one or more correction devices including the input device for verification/correction of the digital input data at the point of entry.

6. The electronic clipboard claimed in claim 5, wherein the correction devices include one or more of the following:
(a) A display for displaying the digital input data;
(b) At least one input device for navigating within the digital input data;
(c) A real or virtual key pad that enables correction of the digital input data;
(d) A scroll device that enables selection of alphanumeric characters for correction of the digital input data.

7. The electronic clipboard claimed in claim 5, wherein the electronic clipboard includes a location/identification facility that enables the electronic clipboard to determine the particular paper form being processed, and the location of the paper form on the panel.

8. The electronic clipboard claimed in claim 5, wherein the electronic clipboard is operable to connect to a remote computer for processing of the digital input data for one electronic form or multiple electronic forms.

9. The electronic clipboard claimed in claim 5, wherein the connection is a wireless connection that supports two-way communication between the electronic clipboard and the remote computer.

10. The electronic clipboard claimed in claim 9, wherein the remote computer consists of a desktop computer that includes a forms creation application for creating electronic forms corresponding to the paper forms, the electronic forms defining rules for processing the digital input data.

11. The electronic clipboard claimed in claim 5, wherein the remote computer consists of a server computer, the server computer including a server application for:
(a) Creating electronic forms corresponding to the paper forms, the electronic forms defining rules for processing the digital input data;
(b) Processing the digital input data included in particular fields of the electronic forms based on the rules for processing the. digital input data corresponding to the particular fields; and
(c) Establishing traffic parameters for defining the routing of particular digital input data, including transmission to third party computer systems, and applying the traffic parameters to digital input data received from the electronic clipboard.

12. The electronic clipboard claimed in claim 11, wherein the server application also provides instructions for creating electronic forms linked to financial transactions and processing the financial transactions linked to the electronic forms.

13. The electronic clipboard claimed in claim 5 further comprising a biometric device including a biometric sensor and an encryption/authentication facility that are operable based on biometric input provided to the biometric sensor to perform one or more of the following functions:
(a) Restrict access to the functions of the electronic clipboard to authorized users only;
(b) Confirm the presence of particular individuals at the time the electronic form was completed; or
(c) Encrypt/authenticate the digital input data.

14. A system for providing a digital workflow associated with the completion of a paper form, the electronic clipboard comprising:
(a) An electronic clipboard including:
(i) A panel for receiving a paper form;
(ii) A computer linked to a memory, the computer being operable to receive computer instructions defining a clipboard computer application, the computer application being operable to process an electronic form corresponding to the paper form;
(iii) An input device operable to complete the paper form with handwritten input data and creating digital signals corresponding to the handwritten input data, wherein the computer application is operable to interpret the digital signals so as to define digital input data, said digital input data corresponding to the handwritten input data; and
(iv) A verification/correction facility linked to the computer application, a display and one or more correction devices including the input device for verification/correction of the digital input data at the point of entry; and
(b) A remote computer linked to the electronic clipboard, the remote computer including:
(i) a forms creation computer application for creating electronic forms corresponding to paper forms, the electronic forms defining rules for processing the digital input data; and
(ii) a form processing computer application operable to process the digital input data based on the corresponding rules for processing the digital input data;
wherein the electronic clipboard and the remote computer are linked to permit the remote computer to forward particular digital input data to particular software applications associated with the remote computer for processing of the particular digital input data.

15. The system as claimed in claim 14, wherein the remote computer consists of a server computer, the server computer including a server application for:
(a) Creating electronic forms corresponding to the paper forms, the electronic forms defining rules for processing the digital input data;
(b) Processing the digital input data included in particular fields of the electronic forms based on the rules for processing the digital input data corresponding to the particular fields; and
(c) Establishing traffic parameters for defining the routing of particular digital input data, including transmission to third party computer systems, and applying the traffic parameters to digital input data received from the electronic clipboard.

16. The system as claimed in claim 15, wherein the server application also provides instructions for creating electronic forms linked to financial transactions, including credit/debit card transactions, and processing the credit/debit card transactions linked to the electronic forms.

17. The system as claimed in claim 16, wherein:
(a) the electronic clipboard includes a biometric device including a biometric sensor and an encryption/authentication facility that is operable to encrypt/authenticate the digital input data based on biometric input provided to the biometric sensor; and
(b) wherein the server application is operable to encrypt data at the field level to a database linked to the server computer.

18. A computer program, including a computer readable medium, configurable to provide instructions to a computer associated with an electronic clipboard to:
(a) Receive an electronic form corresponding to a paper form, the electronic form including a plurality of rules for processing digital input data;
(b) Identify a particular paper form and define its location on a panel of the electronic clipboard;

(c) Capture digital input data from handwritten data included in the paper form by operation of an input device;

(d) Display the digital data for verification and/or correction of the digital data at the point of entry by operation of a verification/correction facility provided by the input device; and (e) Process the digital data in accordance with the rules for processing digital input data.

19. The computer program claimed in claim 18, further configurable to:

(a) Transmit the digital input data via a wireless connection to a remote computer.

20. The computer program claimed in claim 19, further configurable to:

(a) Enable two-way communications between the electronic clipboard and the remote computer.

21. A point of sale device comprising:

(a) An electronic clipboard comprising:

(i) A panel for receiving a paper form;

(ii) A computer linked to a memory, the computer being operable to receive computer instructions defining a clipboard computer application, the computer application being operable to process an electronic form corresponding to the paper form;

(iii) An input device operable to complete the paper form with handwritten input data and create digital signals corresponding to the handwritten input data, wherein the computer application is operable to interpret the digital signals so as to define digital input data, said digital input data corresponding to the handwritten input data; and (iv) A verification/correction facility linked to the computer application, a display and one or more correction devices including the input device for verification/correction of the digital input data at the point of entry; and Wherein the electronic clipboard enables the input of financial transaction data by one or more of the following input means:

A Swipe card reader linked to the electronic clipboard;

(v) A keypad; or (vi) Handwriting of the financial transaction data in a particular field of the paper form.

22. A point of sale device as claimed in claim 21, wherein the electronic clipboard enables the generation of a transaction record and optionally an invoice.

23. The point of sale device as claimed in claim 22, wherein the electronic clipboard enables the creation of a digital carbon copy of the transaction record, including the signature of an individual, which digital carbon copy is operable to provide a digital record of the transaction.

24. A point of sale device as claimed in claim 22, wherein the transaction record or invoice is a credit/debit card receipt generated by the computer application utilizing the financial transaction data and a gateway function whereby the computer application interfaces with the web-based reporting tools for billing/accountability to the end user to provide a commerce transaction using a credit card or debit card.

* * * * *